United States Patent
Kim

(10) Patent No.: US 8,055,194 B2
(45) Date of Patent: Nov. 8, 2011

(54) METHOD FOR SEARCHING FOR DEVICES FOR BLUETOOTH COMMUNICATION IN WIRELESS TERMINAL

(75) Inventor: So-Hee Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 702 days.

(21) Appl. No.: 11/704,180

(22) Filed: Feb. 8, 2007

(65) Prior Publication Data

US 2007/0202808 A1 Aug. 30, 2007

(30) Foreign Application Priority Data

Feb. 8, 2006 (KR) .................. 10-2006-0012135

(51) Int. Cl.
*H04B 7/00* (2006.01)
(52) U.S. Cl. ..................... 455/41.2; 455/41.3
(58) Field of Classification Search .......... 455/41.2, 455/41.3, 410, 411, 415, 3.04, 435.2, 500, 455/67.11
See application file for complete search history.

(56) References Cited

U.S. PATENT DOCUMENTS

| | | | |
|---|---|---|---|
| 7,103,313 B2 * | 9/2006 | Heinonen et al. | 455/41.2 |
| 7,570,943 B2 * | 8/2009 | Sorvari et al. | 455/414.1 |
| 7,590,086 B2 * | 9/2009 | Olkkonen et al. | 370/328 |
| 2005/0148360 A1 | 7/2005 | Uchiyama | |

FOREIGN PATENT DOCUMENTS

| | | |
|---|---|---|
| JP | 2002290416 | 4/2002 |
| KR | 10-2002-0071153 | 9/2002 |

\* cited by examiner

*Primary Examiner* — Eugene Yun
(74) *Attorney, Agent, or Firm* — The Farrell Law Firm, P.C.

(57) ABSTRACT

A method for searching for devices for Bluetooth communication in a wireless terminal, by which Bluetooth communication can be easily carried out through various search options. The method includes displaying search options if a search is selected for a Bluetooth communication, displaying search keywords corresponding to a search option if the corresponding search option is selected from the search options, and attempting a Bluetooth communication with a device corresponding to the corresponding search keyword if the corresponding search keyword is selected from the displayed search keywords.

11 Claims, 2 Drawing Sheets

METHOD FOR SEARCHING FOR DEVICES FOR BLUETOOTH COMMUNICATION IN WIRELESS TERMINAL

PRIORITY

This application claims priority to an application filed with the. Korean Intellectual Property Office on Feb. 8, 2006 and assigned Serial No. 2006-12135, the contents of which are incorporated herein by reference.

BACKGROUND OF THE INVENTION

1. Field of the Invention

The present invention generally relates to a method for searching for devices for Bluetooth communication in a wireless terminal, and more particularly to a method for searching for devices for Bluetooth® (hereinafter "Bluetooth") communication in a wireless terminal which can easily carry out Bluetooth communication through various search options.

2. Description of the Related Art

Conventional processes of searching for devices for Bluetooth communication in a device with a Bluetooth function may be classified into a Generic Access Profile (GAP) process and a Service Discovery Protocol (SDP) process.

The GAP includes an inquiry, a name discovery, and a device discovery, through which it is possible to gain information with respect to a device address, a device name, and a class of device.

The SDP, among the processes of searching for Bluetooth, provides information in relation to an available service, which is provided by a device capable of carrying out Bluetooth communication.

The SDP generally includes SDP clients and an SDP server. All devices having a Bluetooth function must have a function as the SDP client or server, or both functions as the SDP client and server. Since the SDP has a client and server structure, most SDP instructions have request and response structures. When the SDP client requests the service discovery, the SDP server responds to the request.

The SDP server has a database including information with respect to all services which are provided by the device to which the SDP server belongs and which has a Bluetooth function. Therefore, when the SDP client requests the SDP server do something, the SDP server can search the database and respond to the request. At this time, the SDP server informs the SDP client of the property of services provided by the device having the Bluetooth function, using assigned numbers which are designated by a Bluetooth Special Interest Group (Bluetooth SIG) and called a "Universally Unique Identifier (UUID)". The SDP server can obtain the service information supported by the device to carry out the Bluetooth communication, through the above mentioned SDP process.

The SDP server carries out the Bluetooth communication with a corresponding device using a Bluetooth address and a service ID which the SDP server gains through the above mentioned searching process, and is connected to the corresponding service of the device carrying out the Bluetooth communication with the SDP server. The SDP server generates a link-key as soon as it is connected to the corresponding service, and then stores the link-key. The link-key stored in the database is used when the SDP server is connected to the corresponding device again, so that the SDP server avoids performing the above-mentioned searching process again.

However, the conventional wireless terminal merely stores the link-key in the database, and has no function to search for desired information from a database corresponding with each search option. For example, in order to connect a stereo headset to the wireless terminal, the wireless terminal merely seeks a device corresponding to the stereo headset among the devices stored in the database and connects the device to the wireless terminal. Further, in the wireless terminal, since the SDP process is improperly performed and all service information needed to operate the device is not stored, there exists an inconvenience in that the search is carried out from the beginning again in order to connect the wireless terminal to another service of the same device.

SUMMARY OF THE INVENTION

Accordingly, the present invention has been made to solve the above-mentioned problems occurring in the prior art, and it is an object of the present invention to provide a method for searching for devices for Bluetooth communication in a wireless terminal which can easily carry out the Bluetooth communication through various search options.

In order to accomplish this object of the present invention, there is provided a method for searching for devices for Bluetooth communication in a wireless terminal, which includes displaying search options if a search is selected for a Bluetooth communication; displaying searching keywords corresponding to a search option if the corresponding search option is selected from the search options; and attempting a Bluetooth communication with a device corresponding to the corresponding search keyword if the corresponding searching keyword is selected from the displayed search keywords.

In order to accomplish this object of the present invention, there is provided a method for searching a device for a Bluetooth communication in a wireless terminal, which includes selecting a search option for the Bluetooth communication; displaying available service categories if the service categories are selected from the search option; displaying device categories to carry out a corresponding service if the corresponding service is selected from the displayed service categories; and attempting a Bluetooth communication with a corresponding device if the corresponding device is selected from the displayed device classes.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
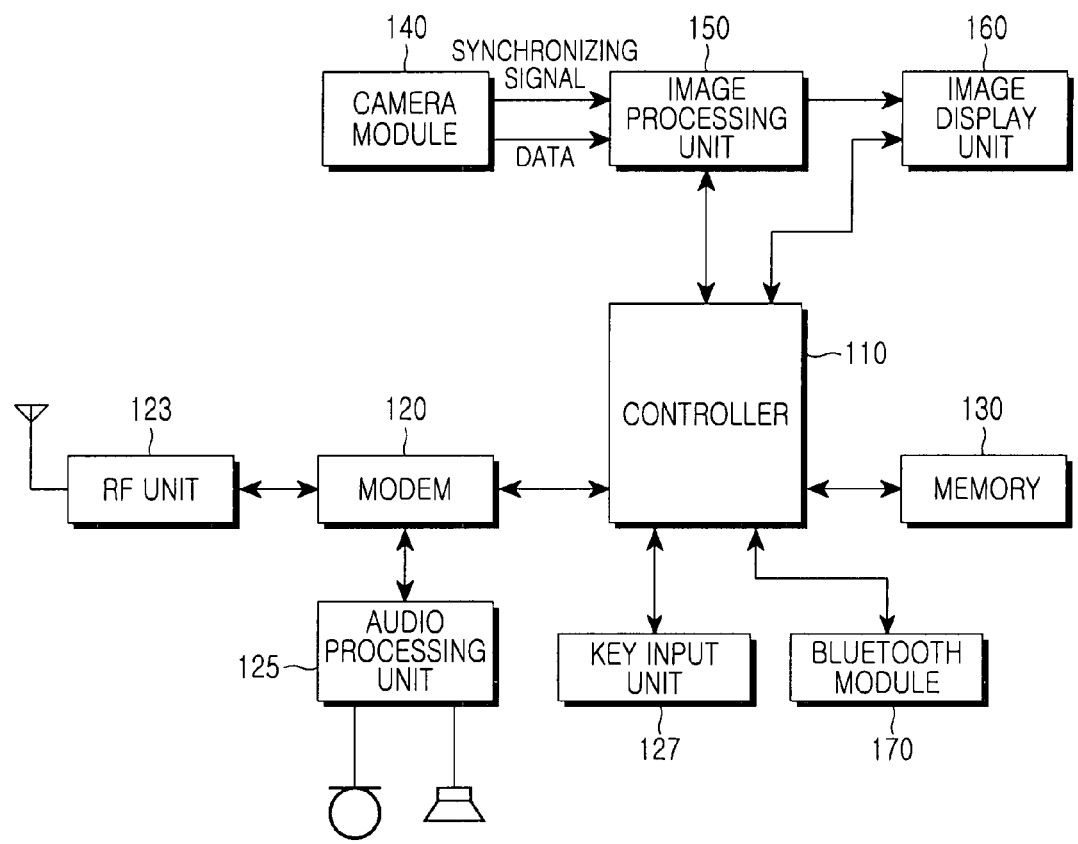
FIG. 1 is a block diagram showing the structure of a wireless terminal according to the present invention.

Hereinafter, a preferred embodiment of the present invention will be described with reference to the accompanying drawings. In the drawings, the same reference numerals are used to designate the same elements.

Referring to FIG. 1, which shows a wireless terminal structure according to the present invention, a Radio Frequency (RF) unit 123 carries out a wireless communication function of the wireless terminal. The RF unit 123 includes an RF transmitter for up-converting and amplifying a frequency of the transmitted signal, and an RF receiver for low-noise amplifying a received signal and down-converting a frequency of the received signal. A modem 120 is provided with a transmitter for encoding and modulating the transmitted signal, and a receiver for decoding and demodulating the received signal. An audio processing unit 125 forms a codec which includes a data codec for processing packet data, etc., and an audio codec for processing audio signals such as voice, etc. The audio processing unit 125 converts digital audio signals, which are received from the modem 120, into analog signals through the audio codec so as to reproduce sound, or converts analog audio signals, which are input from a microphone, into digital audio signals through the audio codec so as to transmit the digital audio signals to the modem 120. The codec may be separately provided or embedded in a controller 110.

A memory 130 includes a program memory and a data memory. The program memory has programs for controlling the general operation of the wireless terminal, and programs for searching for a device capable of performing the Bluetooth communication based on each search option according to the present invention, which are stored therein. Further, the data memory temporarily stores data generated during the execution of the programs. The memory 130 can also classify information about the device for performing Bluetooth communication into groups of search options, so as to store them in a database according to the present invention.

The search options include a device name, a device address, a device class, and service categories.

The controller 110 controls the entire operation of the wireless terminal. Further, the controller 110 may include the modem 120 and the codec.

Meanwhile, in a mode of searching for devices for Bluetooth communication, the controller 110 classifies information about devices for performing Bluetooth communication into groups of identical categories, and enables the wireless terminal to display the search options corresponding to the groups.

The controller 110 classifies information about devices for performing Bluetooth communication, for example, device names, device addresses, device classes, and service categories, into groups of identical categories, and enables the wireless terminal to display the search options corresponding to groups in the mode of searching for devices for Bluetooth communication according to the present invention. Furthermore, the controller 110 searches for devices capable of currently performing Bluetooth communication in the mode of searching for devices for carrying out Bluetooth communication, and classifies information about the found devices into groups of identical categories so as to enable the wireless terminal to display the information according to the corresponding search options.

Further, the controller 110 classifies information about existing devices which have communicated with the wireless terminal through Bluetooth communication, and information about the present devices, which are able to carry out Bluetooth communication, into groups of identical categories, so as to enable the wireless terminal to display the search option. Furthermore, the controller 110 displays search keywords classified into a corresponding group among the groups of search option, which are displayed in the mode of searching for devices for Bluetooth communication, and attempts to carry out Bluetooth communication with the device corresponding to the search keyword, which is selected from the search keywords. At this time, the controller 110 enables the wireless terminal to arrange and display the search options according to priority, for example a frequency of use, data, time, etc.

In addition, if a corresponding device is a device which had previously communicated with the wireless terminal through a Bluetooth communication, the controller 110 enables the wireless terminal to attempt a Bluetooth communication with the corresponding device through the already-stored link-key. Further, if a corresponding device is a device which can presently carry out a Bluetooth communication, the controller 110 enables the wireless terminal to attempt a Bluetooth communication with the corresponding device through certification such as the input of a password.

The Bluetooth module 170 carries out wireless communication with a device having a Bluetooth module, and performs receiving services provided by the device or transmitting services of the wireless terminal.

A camera module 140 includes a camera sensor for taking a picture of image data and converting optical signals of a photograph into electric signals, and a signal processing unit for converting analog image signals, which are taken by the camera sensor, into digital data. Here, a Charge Coupled Device (CCD) sensor may be used as the camera sensor, and a Digital Signal Processor (DSP) may be used as the signal processing unit. Further, the camera sensor and the signal processing unit may be integrally or separately made.

An image processing unit 150 creates image data in order to display image signals output from the camera module 140. The image processing unit 150 processes the image signals output from the camera module 140 by a unit frame, and then outputs the frame of the image data in order to meet characteristics and size of an image display unit 160. Further, the image processing unit 150 includes an image codec, which either compresses the frame of the image data displayed on the image display unit 160 in a desired manner or recovers the compressed frame of the image data to the original frame of the image data. The image codec can include, for example, a JPEG codec, an MPEG4 codec, a Wavelet codec, etc. The image processing unit 150 may have an on-screen display function, and display on-screen data according to the size of the image displayed under the control of the controller 110.

The image display unit 160 displays the image signals, output from the image processing unit 150 on a screen of the wireless terminal, and users' data output from the controller 110. A liquid crystal display (LCD) may be used as the image display unit 160, where the image display unit 160 would include an LCD controller, a memory for storing the image data, an LCD display device, etc. A touch-screen type LCD may also be used as the image display unit 160, where the touch-screen type LCD may function as an input unit. The image display unit 160 can display various search options in a mode of searching for devices capable of performing the Bluetooth communication. A key input unit 127 includes keys for inputting numerals and characters and function keys for setting various functions.

The operation of the wireless terminal for searching for devices in order to perform Bluetooth communication will be described. When searching of devices is selected in order to perform Bluetooth communication in the wireless terminal, the controller 110 detects the selection of searching and enables the image display unit 160 to display the search options. Then, if a corresponding search option is selected from the search options, the controller 110 detects the selection of the corresponding search options. Next, the controller 110 extracts and groups only information about the corresponding search options from information about the device connected to the wireless terminal through Bluetooth communication and information about the device capable of currently performing a Bluetooth communication, so as to allow the image display unit 160 to display the search keywords. If a corresponding search keyword is selected from the search keywords, the controller 110 detects the selection of the search keyword and controls the wireless terminal to attempt a Bluetooth communication with the device corresponding to the corresponding search keyword. For example, if the search option corresponding to the service category among the search options is selected, the controller 110 detects the selection of the search option. Then, the controller 110 extracts and groups information corresponding to the search options, i.e. only information about the service categories, from information (for example, device names, device addresses, device classes, service categories, etc.) about the device which had been previously connected to the wireless terminal through a Bluetooth communication, and information about the device capable of currently carrying out a Bluetooth communication, so as to enable the image display unit 160 to display the search keywords such as an audio service and a video service. If the search keyword for the audio service is selected from a group of searching keywords according to the service category, the controller 110 detects the selection of the search keyword of the audio service and enables the wireless terminal to attempt a Bluetooth communication with the corresponding device capable of performing the audio service.

Figure 2:
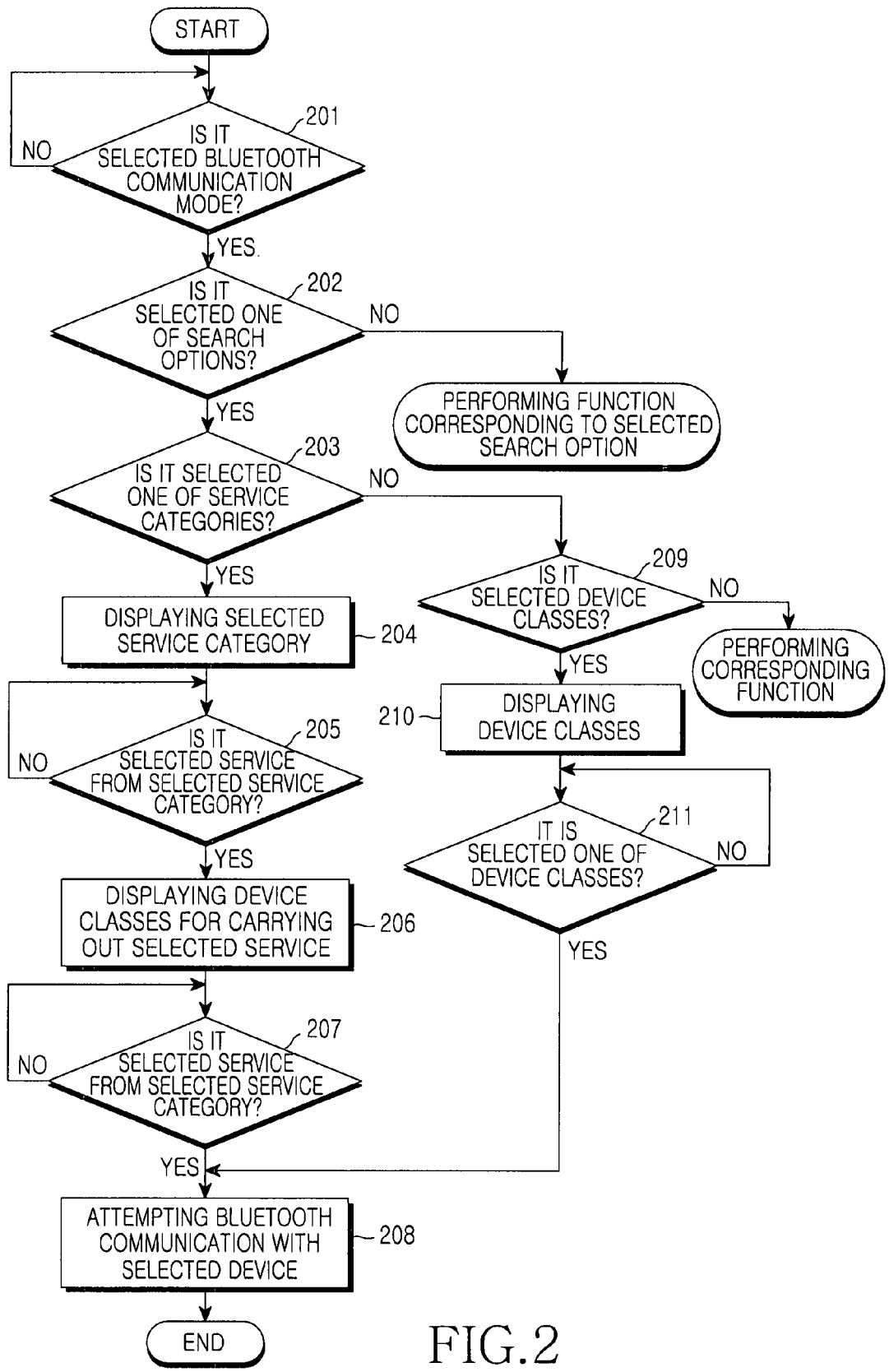
FIG. 2 is a flowchart illustrating processes for searching devices for a Bluetooth communication in the wireless terminal according to the present invention.

FIG. 2 is a flowchart illustrating processes for searching for devices for Bluetooth communication in the wireless terminal according to the present invention. Only the service categories and the device classes among the search options provided in the mode of searching for devices will be described.

Referring to FIG. 2, if the Bluetooth mode is selected in the wireless terminal, the controller 110 detects the selection of the Bluetooth mode and converts a communication mode into a Bluetooth communication mode at step 201. If a search is selected in the Bluetooth communication mode, the controller 110 detects the selection of the search and converts the wireless terminal into a mode of searching for a device capable of carrying out a Bluetooth communication in order to display the search options at step 202. It is possible to display the search options including the device names, the device addresses, the device classes and the service categories at step 202.

If the service category is selected from the displayed search options in the device searching mode, the controller 110 detects the selection of the service category at step 203, and displays the service categories at step 204. At step 204, the controller 110 searches for the devices which had been previously connected to the wireless terminal. Further, the controller 110 extracts and groups only the service categories from the information (device names, device addresses, device categories, service categories, etc) of the searched devices. The step of grouping the service categories is accomplished when the wireless terminal communicates with the existing device through Bluetooth communication.

Further, the controller 110 controls the wireless terminal to search for a device capable of currently carrying out performing a Bluetooth communication at step 204. If a device for currently carrying out a Bluetooth communication is found, the controller 110 receives information about the device by the search processes (GAP or SDP). Then, the controller 110 extracts and groups only the service category from the received device information (the device name, the device address, the device class, the service category, etc.) so as to display the service category.

In addition, at step 204, the controller 110 enables the wireless terminal to arrange and display the service categories according to priority depending on users' choice. The priority may include a frequency of use, date, time, etc.

If the corresponding service is selected from the displayed service categories at step 204, the controller 110 detects the selection of the corresponding service at step 205 and displays the device class capable of performing the selected service at step 206.

At step 206, the controller 110 enables the wireless terminal to display the devices, which are selected at step 205 from devices connected to the wireless terminal through a Bluetooth communication and devices capable of currently performing a Bluetooth communication so as to carry out the corresponding service.

Further, the controller 110 enables the wireless terminal to arrange and display the device classes according to priority, such as the frequency of use, date, time, etc., depending on users' choice, at step 206.

If the corresponding device is selected from the displayed device classes at step 206, the controller 110 detects the selection of the corresponding device at step 207, and attempts a Bluetooth communication with the selected device at step 208.

At step 208, in the case where the selected device is experienced in connection with the wireless terminal through a Bluetooth communication, the controller 110 enables the wireless terminal to attempt a Bluetooth communication with the corresponding device using the link-key which is stored at the time the wireless terminal previously communicated with the corresponding device. Further, in the case where a selected device is able to carry out a Bluetooth communication with the wireless terminal, the controller 110 enables the wireless terminal to attempt a Bluetooth communication with the corresponding device after certification, such as an input of a password, is carried out.

Further, if the device class is selected from the search option displayed in the device searching mode, the controller 110 detects the selection of the device class at step 209 and displays the device class at step 210. At step 210, the controller 110 searches devices which had been connected to the wireless terminal through a Bluetooth communication. Then, the controller 110 extracts and groups only the device class from the information, i.e. the device name, the device address, the device class, the service class, etc., about the found devices so as to display the device class. The step of grouping the device classes may be accomplished when the wireless terminal was previously connected to the device through a Bluetooth communication.

At step 210, the controller 110 enables the wireless terminal to search for devices capable of currently carrying out a Bluetooth communication. If devices capable of currently carrying out a Bluetooth communication are found, the controller 110 receives information about the devices searched through the search process (GAP and SDP). Then, the controller extracts and groups the device class from the received device information (the device name, the device address, the device class, the service category, etc.), so as to display the device class. In addition, at step 210, the controller 110 distinguishes the device classes which have been previously connected to the wireless terminal through a Bluetooth communication from the device classes with which the wireless terminal can currently communicate through a Bluetooth communication, and enables the wireless terminal to display all of the devices.

At step 210, the controller 210 enables the wireless terminal to arrange and display the device classes according to priority depending on users' choice. The priority includes the frequency of use, date, time, etc.

If a corresponding device is selected from the device classes at step 210, the controller 110 detects the selection of the corresponding device displayed at step 211, and enables the wireless terminal to attempt a Bluetooth communication with the selected device at step 208.

As described above, the present invention provides a method for searching for devices capable of carrying out Bluetooth communication with the wireless terminal through various search options, so that the user of the wireless terminal can conveniently search for devices for carrying out Bluetooth communication.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for searching for devices for Bluetooth communication in a wireless terminal, comprising the steps of:
    displaying search options used for searching for at least one device in order to perform a Bluetooth communication if a search is selected for a Bluetooth communication;
    displaying searching keywords, indicating types of information provided by the at least one device, corresponding to a search option if the search option is selected from the search options;
    displaying device classes corresponding to a search keyword if the searching keyword is selected from the displayed search keywords; and
    attempting a Bluetooth communication with a device if the device is selected from the displayed device classes,
    wherein the at least one device includes an existing device that had communicated with the wireless terminal through a Bluetooth communication, and a present device capable of performing a Bluetooth communication.

2. The method as claimed in claim 1, wherein the search option includes a device name, a device address, device classes, and a service category.

3. A method for searching a device for a Bluetooth communication in a wireless terminal, comprising the steps of:
    selecting a search option among search options used for searching for at least one device in order to perform a Bluetooth communication;
    displaying available service categories provided by the at least one device if the service categories are selected from the search option;
    displaying device classes to carry out a service if the service is selected from the displayed service categories; and
    attempting a Bluetooth communication with a device if the device is selected from the displayed device classes,
    wherein the service categories include a service category provided by an existing device that had communicated with the wireless terminal through a Bluetooth communication, and a service category provided by a present device capable of performing a Bluetooth communication.

4. The method as claimed in claim 3, wherein the service categories are arranged and displayed according to priority.

5. The method as claimed in claim 3, wherein the device classes include an existing device class that had communicated with the wireless terminal through a Bluetooth communication, and a present device class capable of performing a Bluetooth communication.

6. The method as claimed in claim 3, wherein the device classes are arranged and displayed according to priority.

7. The method as claimed in claim 3, wherein the step of attempting the Bluetooth communication comprises:
    attempting to perform a Bluetooth communication with a device through a stored link key if the device is an existing device that had communicated with the wireless terminal through a Bluetooth communication; and
    attempting to perform a Bluetooth communication with a device through certification, if the device is a device capable of performing a Bluetooth communication.

8. The method as claimed in claim 3, further comprising:
    displaying available device classes if a device class is selected from the search options; and
    attempting a Bluetooth communication with a device if the corresponding device is selected from the displayed device classes.

9. The method as claimed in claim 8, wherein the device classes include an existing device class that had communicated with the wireless terminal through a Bluetooth communication, and a present device class capable of performing a Bluetooth communication.

10. The method as claimed in claim 8, wherein the device classes are arranged and displayed according to priority.

11. The method as claimed in claim 8, wherein the step of attempting the Bluetooth communication comprises:
    attempting to perform a Bluetooth communication with a device through a stored link key if the device is an existing device that had communicated with the wireless terminal through a Bluetooth communication; and
    attempting to perform a Bluetooth communication with a device through certification, if the device is a device capable of performing a Bluetooth communication.

* * * * *